(12) United States Patent
Greve et al.

(10) Patent No.: US 6,705,452 B2
(45) Date of Patent: Mar. 16, 2004

(54) ARTICLE-DIVERTING CONVEYOR BELT AND MODULES

(75) Inventors: Christopher G. Greve, Covington, LA (US); Robert S. Lapeyre, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/063,789

(22) Filed: May 13, 2002

(65) Prior Publication Data

US 2003/0209405 A1 Nov. 13, 2003

(51) Int. Cl.[7] ................ B65G 47/10; B65G 47/46; B65G 37/00; B65G 43/00
(52) U.S. Cl. ............... 198/370.02; 198/463.2; 198/890.1
(58) Field of Search ............ 198/370.1, 370.02, 198/463.2, 465.1, 612, 850, 851, 853, 890.1

(56) References Cited

U.S. PATENT DOCUMENTS

| | | | |
|---|---|---|---|
| 4,732,260 A | | 3/1988 | Canziani |
| 5,127,510 A | | 7/1992 | Cotter et al. |
| 5,165,515 A | | 11/1992 | Nitschke et al. |
| 5,275,273 A | | 1/1994 | Veit et al. |
| 5,435,429 A | * | 7/1995 | Van Den Goor ......... 198/890.1 |
| 5,657,858 A | * | 8/1997 | Van Den Goor ............ 198/890 |
| 5,890,584 A | | 4/1999 | Bonnet |
| 5,909,797 A | | 6/1999 | Van Den Goor |
| 5,921,378 A | | 7/1999 | Bonnet |
| 6,041,909 A | | 3/2000 | Shearer, Jr. |
| 6,044,956 A | | 4/2000 | Henson et al. |
| 6,139,240 A | | 10/2000 | Ando ......................... 414/267 |

OTHER PUBLICATIONS

Eskay, "High Speed Sortation Systems" 1999 brochure, Eskay Corporation, Salt Lake City, Utah.

* cited by examiner

*Primary Examiner*—Gene O. Crawford
(74) *Attorney, Agent, or Firm*—James T. Cronvich

(57) ABSTRACT

An article-diverting conveyor belt and modules for constructing such a belt. The conveyor belt includes a series of modules interconnected end to end to other like modules. At least some of the modules include a module body with a positioning belt arranged to move transversely on the module body. A cam follower, attached to the positioning belt, extends below the bottom side of the module. A transport element, also attached to the positioning belt, extends above the top side of the module. The transport element may be a separate piece attached to the positioning belt or an integral outer surface of the positioning belt. The cam follower is guided along a track in the bottom side of the module by a network of guides in a supporting conveyor frame beneath the conveyor belt along the carryway. Because the transport element is attached to the positioning belt on the top side of the module, movement of the cam follower causes the transport element to move by means of the positioning belt. The transport element is thereby programmed by the network of guides, which may be automated, to transport conveyed articles to predetermined transverse positions along the conveying path.

41 Claims, 10 Drawing Sheets

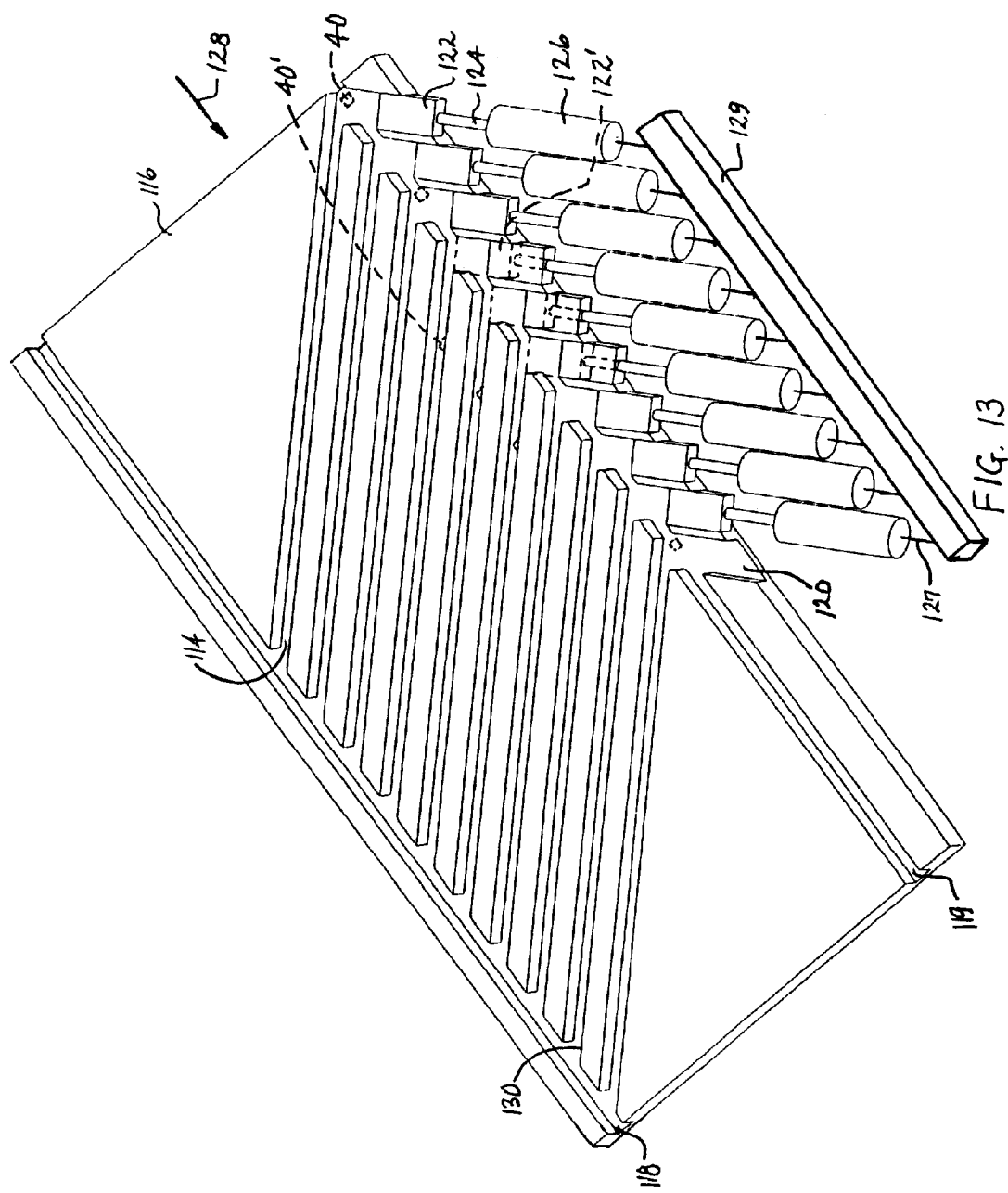

ARTICLE-DIVERTING CONVEYOR BELT AND MODULES

BACKGROUND OF INVENTION

The invention relates generally to the conveying and diverting of articles and, more particularly, to a conveyor belt constructed of plastic modules having movable transport elements to transport conveyed articles across the conveying surface of the belt.

Typical diverting conveyor systems include an endless conveyor belt or chain constructed of a series of slats flanked by drive chains. A shoe for pushing articles across the conveyor belt is movably attached to each slat. Typically, the shoe either surrounds the slat, top to bottom and front to back, or has an appendage that extends through a transverse slot formed through the slat from top to bottom. A guide track arrangement in the conveyor frame beneath the conveyor belt guides the shoes across the belt as the belt is driven in the conveying direction. The specific arrangement of the guide track programs the system to push articles to specified positions on the conveyor belt.

One problem with these chain-driven slat conveyors is that their construction limits the placement of connecting joints between consecutive slats because of interference with the shoes and associated appendages. For that reason, the slats can sag in the middle because they are supported mainly at the drive chains positioned out of the shoe's travel range at the side edges of the slats. This problem is especially noticeable on wider conveyors.

Thus, there is a need for a diverting conveyor that is not of the slat-and-chain construction.

SUMMARY OF THE INVENTION

This need and others are satisfied by an article-diverting conveyor belt having features of the invention. In a preferred version of the invention, the conveyor belt is made of a series of rows of belt modules. Each of the belt modules includes a module body extending longitudinally from a forward end to a rearward end, transversely from a left edge to a right edge, and from a top side to a bottom side through the thickness of the module. Hinge elements are spaced apart along each of the ends. At least some of the modules include a cam follower extending from the bottom side and arranged to move transversely across the bottom side of the module body. A positioning belt is arranged on the module and attached to the cam follower to move with it. The forward and rearward hinge elements of adjacent rows are interleaved and joined by hinge pins at hinge joints to form the conveyor belt.

In another version, the conveyor belt is made of a series of rows of belt modules. Each of the belt modules includes a module body extending longitudinally from a forward end to a rearward end, transversely from a left edge to a right edge, and from a top side to a bottom side through the thickness of the module. Hinge elements are spaced apart along each of the ends. At least some of the modules include a cam follower extending from the bottom side and arranged to move transversely across the bottom side of the module body. A transport element extends from the top side and is arranged to move transversely across the top side of the module body. The transport element and the cam follower are linked so that the transport element moves across the top side as the cam follower moves across the bottom side. The forward and rearward hinge elements of adjacent rows are interleaved and joined by hinge pins at hinge joints to form the conveyor belt.

In yet another version, the modular conveyor belt is constructed of a series of rows of belt modules extending in width from a left edge to a right edge and in thickness from a top side to a bottom side. At least some of the rows include a first recess in the top side of the row that extends along the width of the row and a second recess in the bottom side of the row that extends along the width of the row. A positioning belt is received in the recesses on the top and bottom sides.

In still another version, the modular conveyor belt comprises a series of rows of belt modules extending in width from a left edge to a right edge and in thickness from a top side to a bottom side. At least some of the rows include an endless positioning belt extending across the width of the row on the top and bottom sides and along the thickness of the row at the left and right edges.

Various versions of modules are usable in conveyor belts having features of the invention. In one version, the conveyor belt module has a module body extending longitudinally from a forward end to a rearward end, transversely from a left edge to a right edge, and from a top side to a bottom side through the thickness of the module. The module is also characterized by a positioning belt arranged to move transversely on the module body and a cam follower attached to the positioning belt and extending below the bottom side for movement with the positioning belt.

In a second version, the conveyor belt module has a body that extends longitudinally from a forward end to a rearward end, transversely from a left edge to a right edge, and in thickness from a top side to a bottom side. The module body is suitable for being interconnected end to end with other module bodies to form a conveyor belt. Furthermore, the module body has a top track extending transversely across the top side of the module between the forward and rearward ends. A transport element is arranged to ride in the top track.

In yet another version, the conveyor belt module has a body that extends longitudinally from a forward end to a rearward end, transversely from a left edge to a right edge, and in thickness from a top side to a bottom side. The module body is suitable for being interconnected end to end with other module bodies to form a conveyor belt. A top track is formed as a transverse recess across the top side of the module body. A bottom track is formed as a transverse recess across the bottom side of the module body. A cam follower rides in the bottom track. An endless positioning belt is received in the recesses and is connected to the cam follower.

An article-diverting conveyor system having features of the invention includes a modular conveyor belt made up of a series of rows of belt modules. At least some of the belt modules have a module body extending longitudinally from a forward end to a rearward end, transversely from a left edge to a right edge, and in thickness from a top side to a bottom side. A cam follower extends from the bottom side and is arranged to move transversely across the bottom side of the module body. A transport element extends from the top side and is arranged to move transversely across the top side of the module body. The transport element is linked to the cam follower so that the transport element moves across the top side as the cam follower moves across the bottom side. Hinge pins interconnect adjacent rows at a hinge joint to form an endless conveyor belt. A network of guides is disposed at the bottom side of the modular conveyor belt along a carryway portion of the conveyor system. The guides engage the cam followers to direct them across the belt to position the transport elements at predetermined transverse positions at specific locations along the carryway.

An automated version of conveyor system includes a conveyor bed supporting a conveyor belt to form a conveyor carryway. The conveyor belt extends transversely from a right side edge to a left side edge, in thickness from a top side to a bottom side, and longitudinally in the direction of belt travel. Cam followers are arranged to move transversely along the bottom side of the conveyor belt at longitudinally spaced locations. The conveyor bed includes an automated guide network. The network is made up of a right-hand lane extending longitudinally along one side of the conveyor bed, a left-hand lane extending longitudinally along the opposite side of the conveyor bed, and a series of skewed lanes formed diagonally across the conveyor bed and communicating with the left-hand lane and the right-hand lane. The right-hand, left-hand, and skewed lanes are all sized to receive the cam followers. Blocking elements are positioned along the left-hand lane and are operable to move between a first retracted position clear of the left-hand lane and a second blocking position blocking the left-hand lane. Each blocking element is associated with an individual skewed lane and diverts a cam follower from the longitudinal lane into the associated skewed lane when the blocking element is in the second blocking position. Actuators connected to the blocking elements move the blocking elements between the first retracted position and the second blocking position. The actuators can simultaneously move consecutive blocking elements into second blocking positions to simultaneously direct consecutive cam followers into consecutive skewed lanes.

In various versions of the conveyor belts and modules, the transport element can be a pusher to push articles across the top side of the belt or an outer surface of the positioning belt or a separate carrier to carry articles across the top side of the belt. In yet another version, the positioning belt is wrapped around wheels at the left and right edges of the modules. In still another version, the bottom track is recessed to facilitate the placement of drive sprockets along the width of the module, rather than just at the side edges as in the slat-and-chain belts, to prevent the modules from sagging. When made of plastic, the modules can be light-weight and yet have enough beam strength to minimize sag.

BRIEF DESCRIPTION OF DRAWINGS

These and other advantages, features, and aspects of the invention are better understood by referring to the following description, appended claims, and accompanying drawings, in which:

FIG. 13 is an isometric, partly schematic, view of a version of an automated guide network usable in a conveyor system as in FIG. 11.

DETAILED DESCRIPTION

Figure 1:
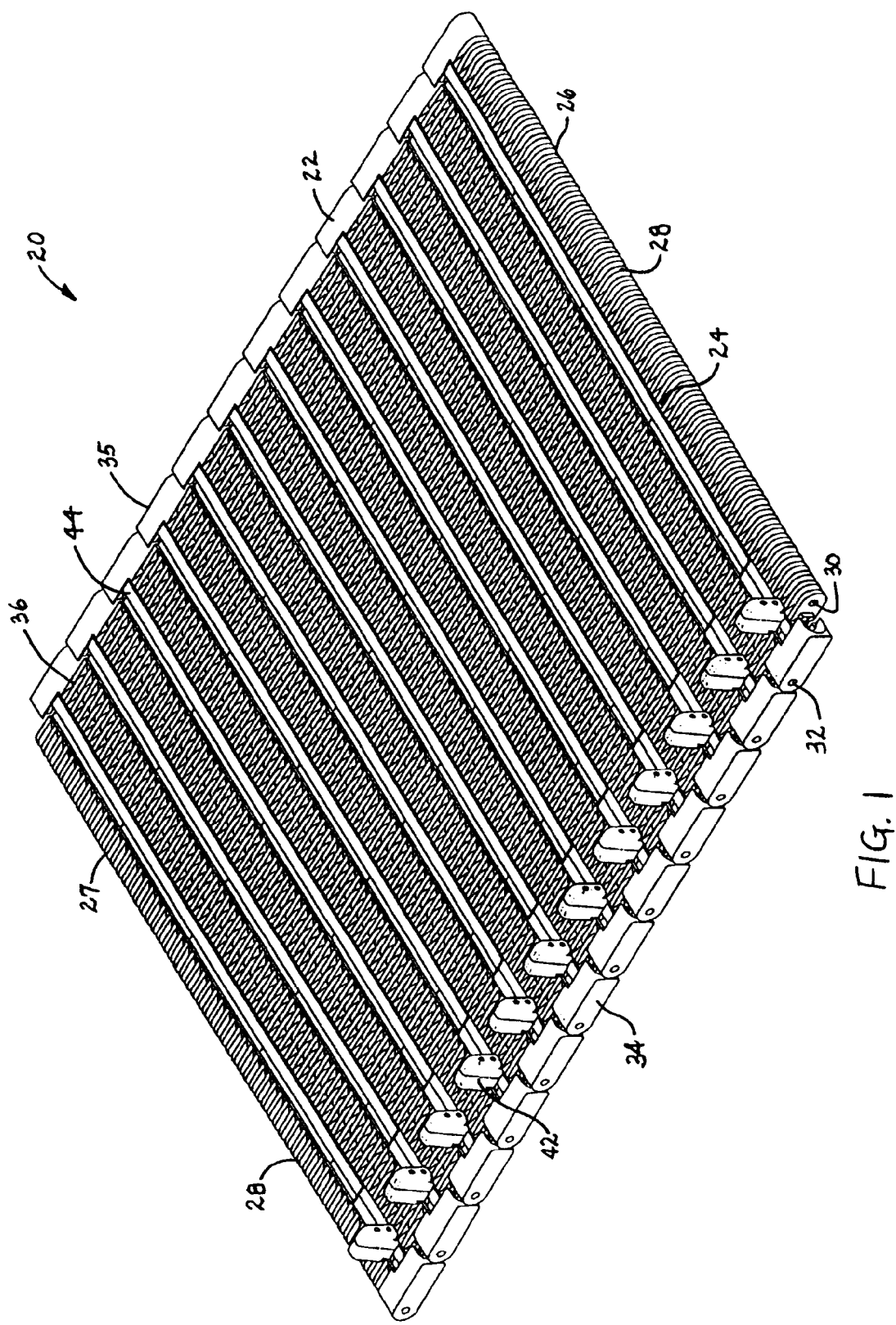
FIG. 1 is an isometric view of a portion of a conveyor belt having features of the invention.
Figure 2:
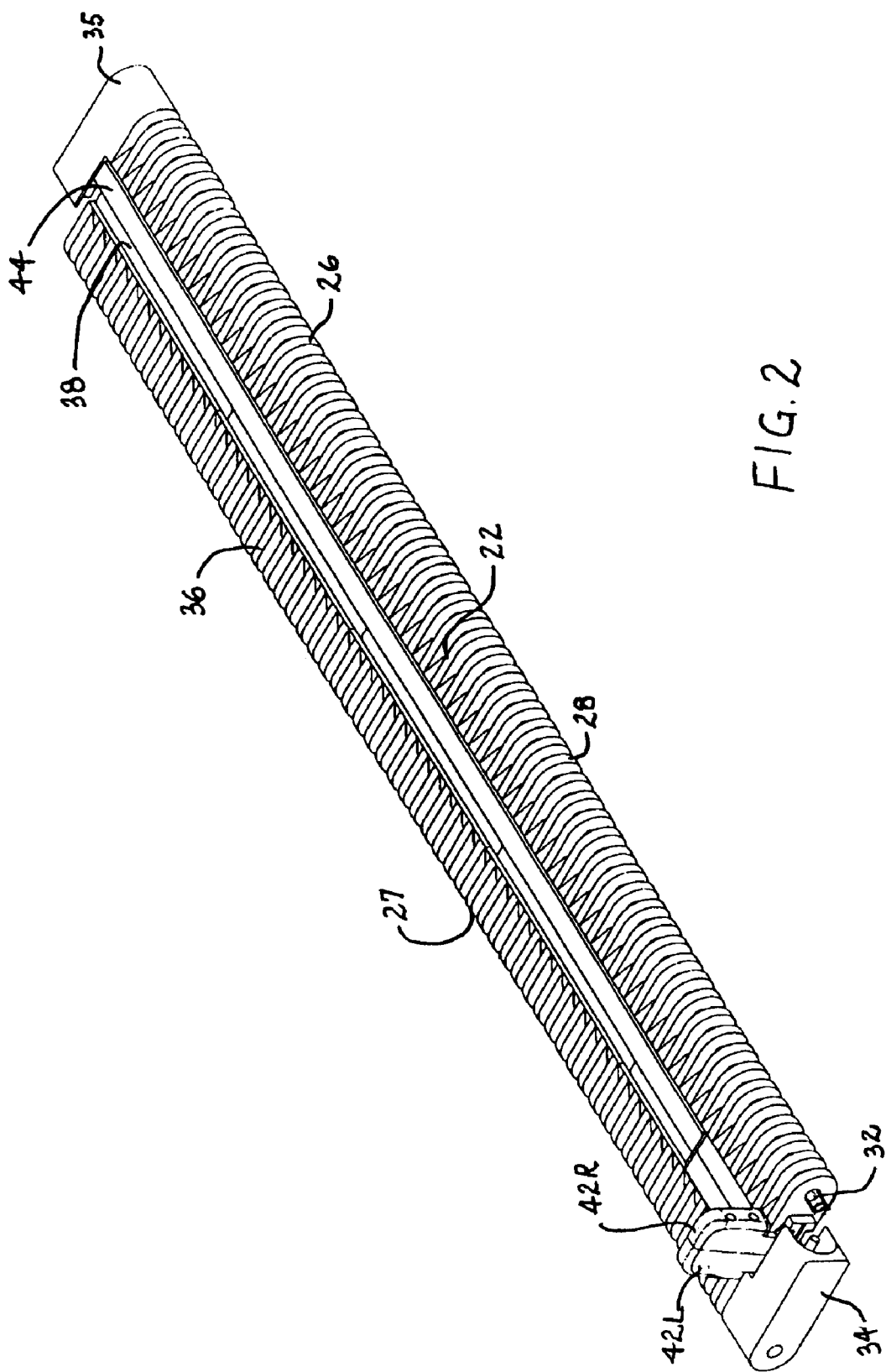
FIG. 2 is a top pictorial view of a module with a pusher usable in the conveyor belt of FIG. 1.
Figure 3:
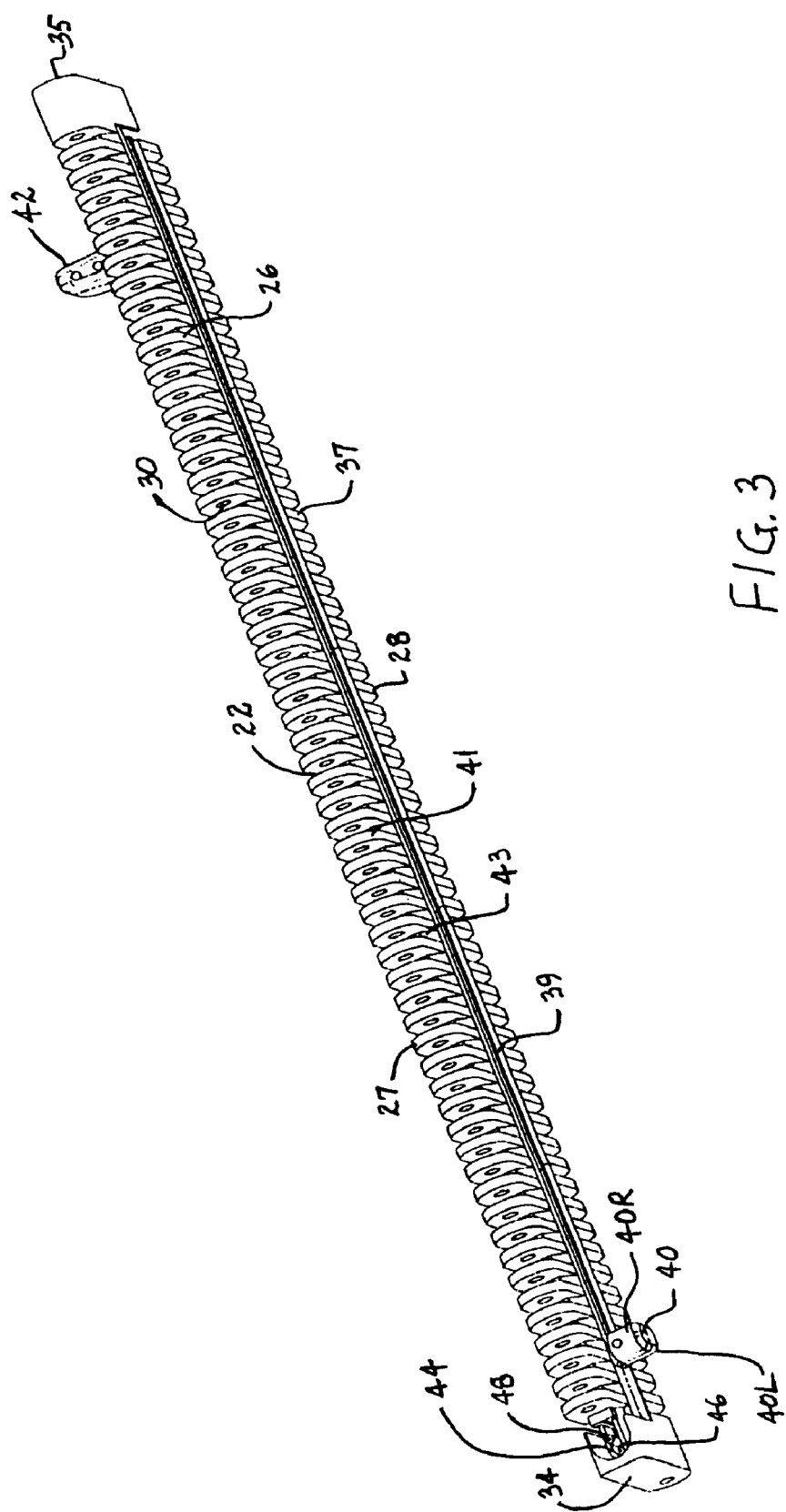
FIG. 3 is a bottom pictorial view of the module of FIG. 2.

A portion of an exemplary version of a modular conveyor belt having features of the invention is shown in FIG. 1. The belt depicted has many of the features of modular plastic conveyor belts, such as those manufactured by, among others, Intralox, Inc., of Harahan, La., USA. The belt 20 is constructed of a series of rows of belt modules 22 connected end to end. In this example, each belt row includes a single module in a most preferred version of the belt, but each row could include a number of interior modules flanked by edge modules and connected with adjacent multi-module rows in a conventional bricklay pattern. In FIG. 1, each module includes a module body 24 extending longitudinally from a forward end 26 to a rearward end 27. Hinge elements 28 are spaced apart transversely along each of the forward and rearward ends. Hinge openings 30 through each of the hinge elements at each end of a module are aligned across the module. The forward hinge elements of a row interleave with the rearward hinge elements of an adjacent row, and the aligned openings form a passageway across the width of the belt. A hinge pin 32 is received in the passageway to interconnect adjacent rows hinge-like into a conveyor belt capable of articulating at each hinge joint. The hinge elements can be closely spaced and integrally molded with the module body, as shown in FIG. 1, or can be spaced-apart elements with individual hinge pins, such as individual chain links supporting an attached platform that is equivalent to the module body shown in the figure. As shown in better detail in FIGS. 2–3, each module body 22 extends transversely from a left edge 34 to a right edge 35. The module body extends in thickness from a top side 36, upon which articles are conveyed, to a bottom side 37, at which a conveyor belt made of such modules would preferably be driven, such as at drive surfaces formed on the periphery 41 of the hinge elements or at intermediate module structure 43 from which the hinge elements extend.

A top track 38 is formed as a transversely extending recess along the top side 36 of the module body. A bottom track 39 is formed as a recess along the bottom side of the module body. The tracks shown in this version are located about midway between the forward and rearward ends of the module body. A cam follower 40 extends from the bottom side of the module and rides along the bottom track. A transport element, such as a pusher 42 in this version, extends from the top side of the module and rides along the top track. The cam follower and the pusher are shown in this version as formed of two cam follower halves 40L, 40R and two pusher halves 42L, 42R. A positioning belt 44, such as a cog or timing belt, links the cam follower and the pusher. The endless positioning belt resides in the top and bottom recesses and is looped about wheels 46 at each end of the tracks at the left and right edges of the belt. In the version shown, the wheels, which are cylindrical and mounted on an axle 48, rotate about longitudinal axes. The positioning belt is looped about the two wheels, which divert it from the top to the bottom track. Because the cam follower and the pusher are both attached to the positioning belt, movement of the cam follower causes the belt to rotate and the pusher to move.

Figure 4:
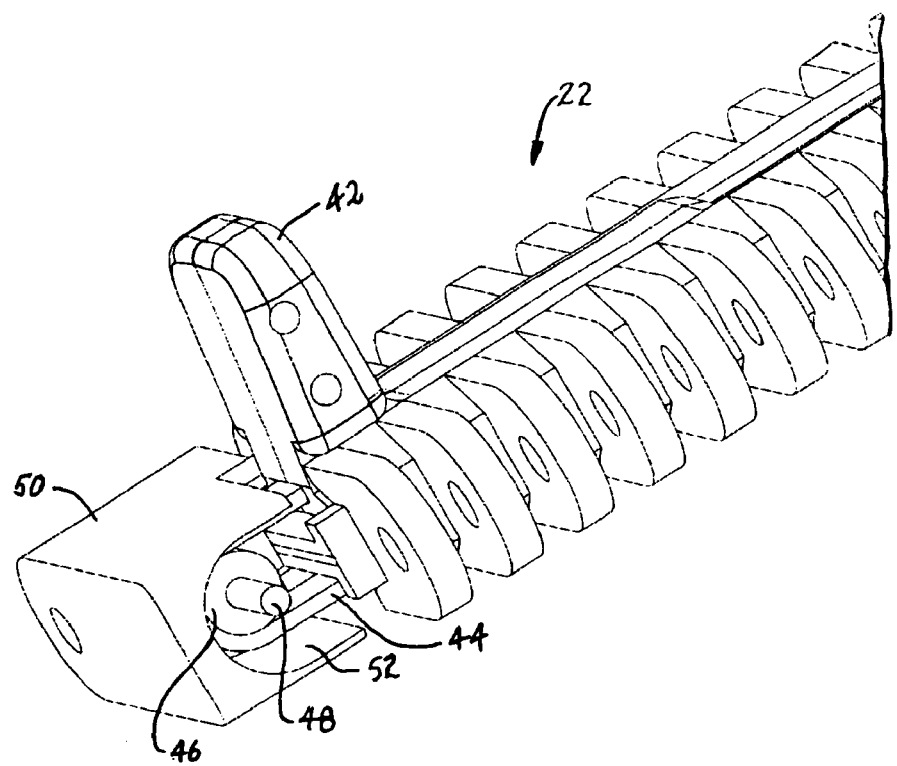
FIG. 4 is a pictorial view of an edge of a module as in FIG. 2.

Further details of the wheel for the positioning belt are shown in FIG. 4. The wheel 46 is shown in an edge portion 50 of the module. The edge portion, which is representative of both belt edges, serves as a protective housing for the wheel, which resides in a cavity 52 formed in the edge portion. The axle 48 is attached at one end to an interior wall bounding the cavity. A bore in the wheel receives the axle and allows the wheel to rotate about the axle, whose axis is in the longitudinal direction. The positioning belt 44 rides around the wheel as the belt transitions between the top and bottom tracks. In other versions of the positioning belt and wheel, the wheel could be a roller, pulley, sheave, or a sprocket with the belt V-shaped or toothed long its inner side. In fact, in some applications, the wheel could even be replaced by a non-rotatable bearing surface directing the positioning belt between the top and bottom tracks.

Figure 5:
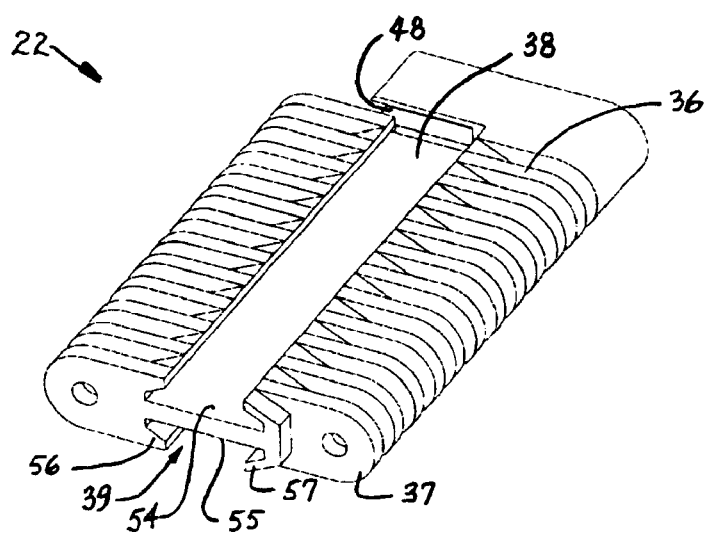
FIG. 5 is a pictorial view of the edge of a module body as in FIG. 2.

Details of the top and bottom tracks 38, 39 in the example version of the belt module are shown in more detail in FIG. 5. Each track includes a base slider bed 54, 55 flanked by overhanging lips 56, 57. The resulting recesses in the top and bottom sides 36, 37 of the module accommodate the pusher, the cam follower, and the positioning belt. The overhanging lips retain the pusher and the cam follower in the top and bottom tracks. Thus, the positioning belt, the cam follower, and the pusher can slide transversely along the tracks with the pusher pushing conveyed articles across the conveyor belt to a predetermined position or even all the way off a side edge to another conveyor or processing station.

Figure 6:
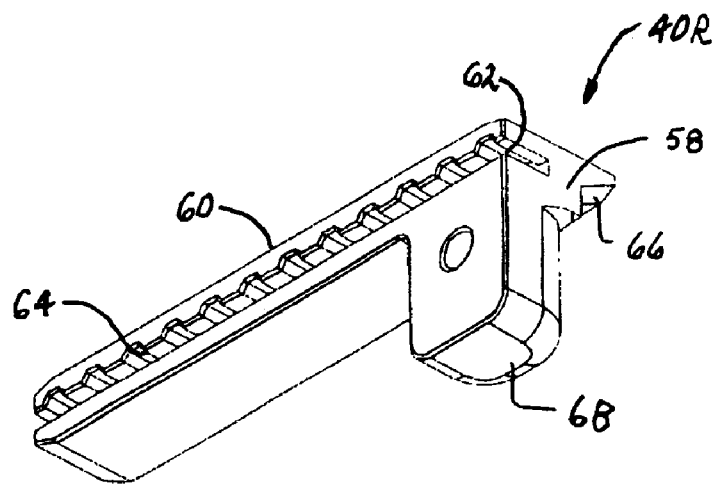
FIG. 6 is a pictorial view of one half of a cam follower usable in the module of FIG. 2.

One half 40R of the cam follower 40 of FIG. 1 is illustrated in FIG. 6. The cam follower includes a base portion 58 with a slider base 60 that slides along the slider bed of the bottom track. The base portion includes a slot 62 to receive the positioning belt. The lower wall 64 bounding the slot is cogged to mate with the outer cogged surface of the positioning belt. The slot is sized to tightly receive the positioning belt for a secure, non-slipping attachment to the cam follower. The side of the base portion opposite the slot is beveled 66 to fit under the lip on the bottom track. A follower stub 68 extends from the base portion. The stub protrudes from the bottom side of the module to engage guide tracks under the conveyor belt. In this version, the other half 40L of the cam follower is generally a mirror image of the first half. This split construction makes it easy to slide both halves together onto the positioning belt and fasten them together in place by means of conventional fastener hardware received in recessed openings 71 or by means of an adhesive applied at the interface of the two halves.

Figure 7:
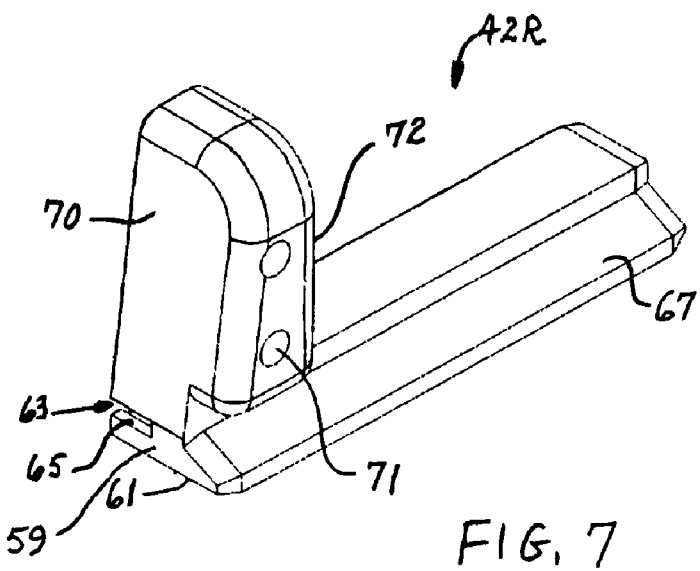
FIG. 7 is a pictorial view of one half of a transport element usable in the module of FIG. 2.

Details of one half 42R of a preferred version of the pusher 42 are shown in FIG. 7. Like the cam follower, the pusher has a base portion 59, a slider base 61, a slot 63, a cogged lower wall 65, and a beveled side 67. These parts function in the same way as their counterparts on the cam follower, except that they operate in the top track. In fact, the base portions of the cam follower and the pusher could be identical. Extending from the base portion is the pusher stub 70, which includes a pushing surface 72 that pushes conveyed articles transversely across the module. As shown, the pusher stub is taller than the cam stub to accommodate tall articles, but, for some articles, the pusher stub could be shorter. Like the preferred cam follower, the pusher is made of a pair of mirror-image halves 42L, 42R. In some applications, the cam follower and the pusher could be identical, interchangeable parts.

Figure 8:
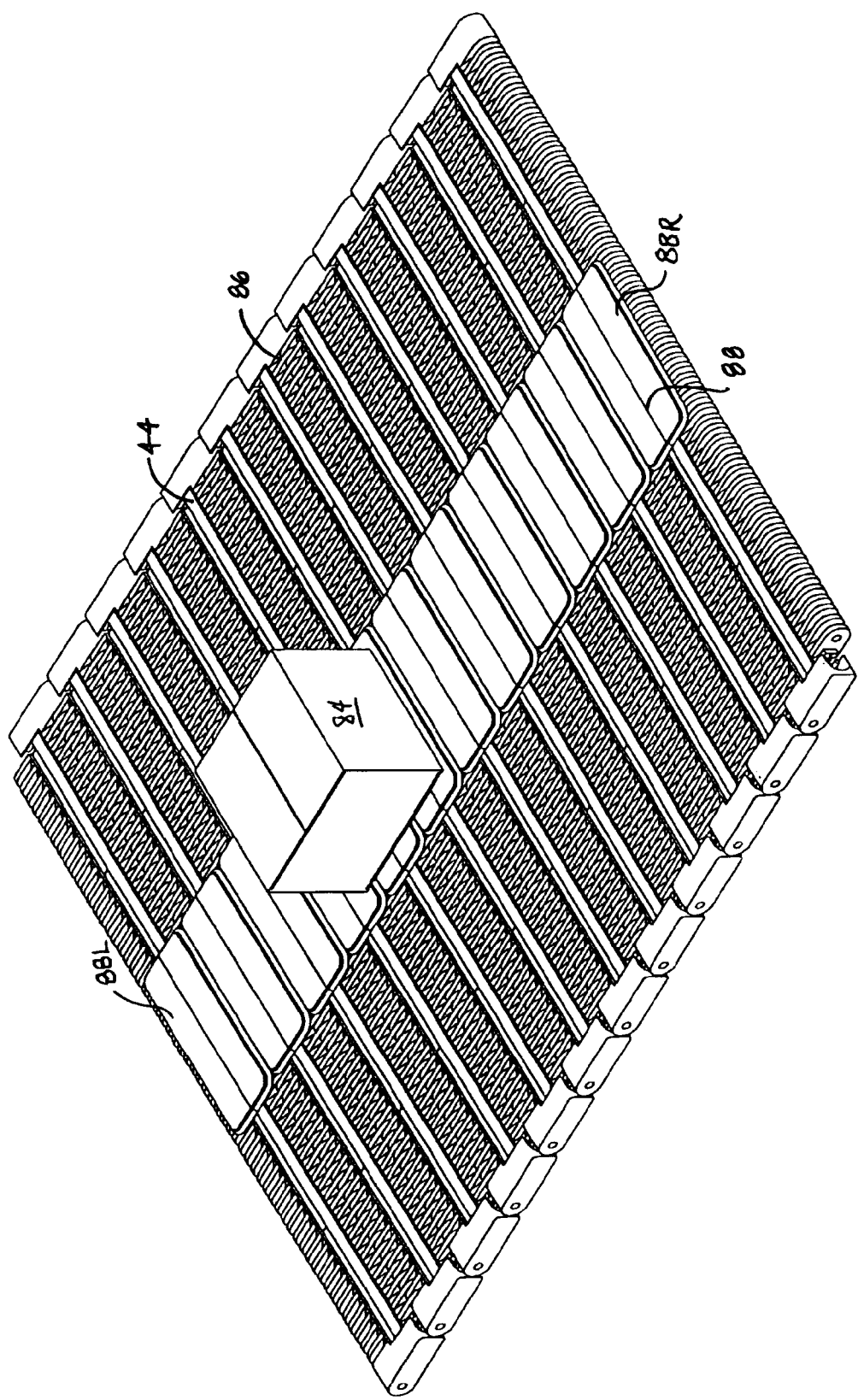
FIG. 8 is an isometric view of a portion of another version of a conveyor belt having features of the invention including an article carrier.
Figure 9:
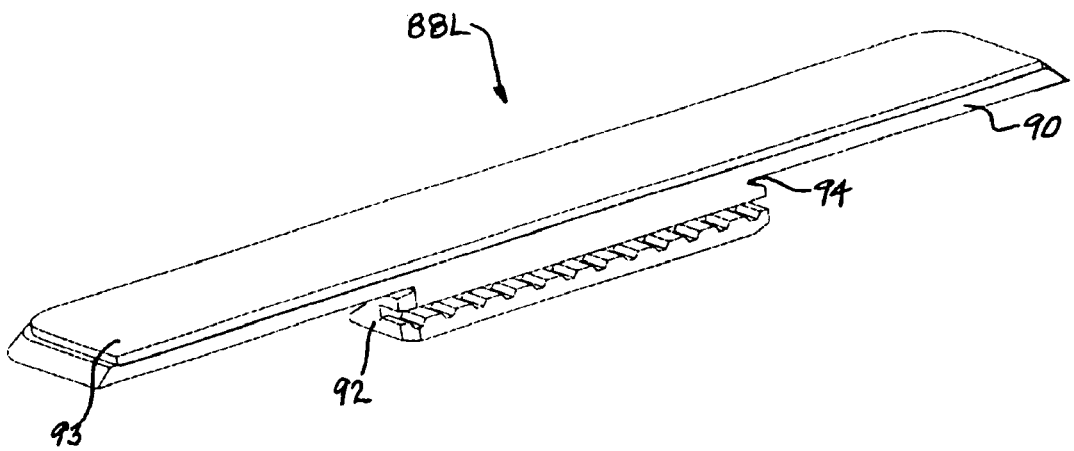
FIG. 9 is a pictorial view of one half of a carrier usable in the conveyor belt of FIG. 8.

FIG. 8 shows another version of conveyor belt usable to position articles across the width of the belt. Each article-diverting belt module 86 used in the conveyor belt has a module body that could be identical to the module body 24 of the belt module 22 in FIG. 1. Instead of a having a pusher as the transport element, the belt module 86 has a carrier 88 formed of two halves 88L, 88R. In this version of belt module, articles 84 ride atop the carrier transversely across the module. The carrier attaches to the positioning belt 44 the way the pusher of FIG. 1 does. The carrier, whose left half 88L is shown in more detail in FIG. 9, includes a platform 90 connected to a base portion 92 by a connecting beam 94. In the version shown, the platform is topped with a high-friction layer 93, such as a rubber-like-material layer, bonded to the platform, such as by adhesives or molding. The high-friction layer keeps the conveyed articles from slipping as the carrier accelerates or decelerates. Knurled or other rough-textured surface treatments are equivalent ways of treating the platform to achieve desirable frictional characteristics. Articles conveyed on a conveyor belt constructed of these modules are supported on the platforms, which position the articles at a desired transverse position at a specified location along the conveyor path.

Figure 10:
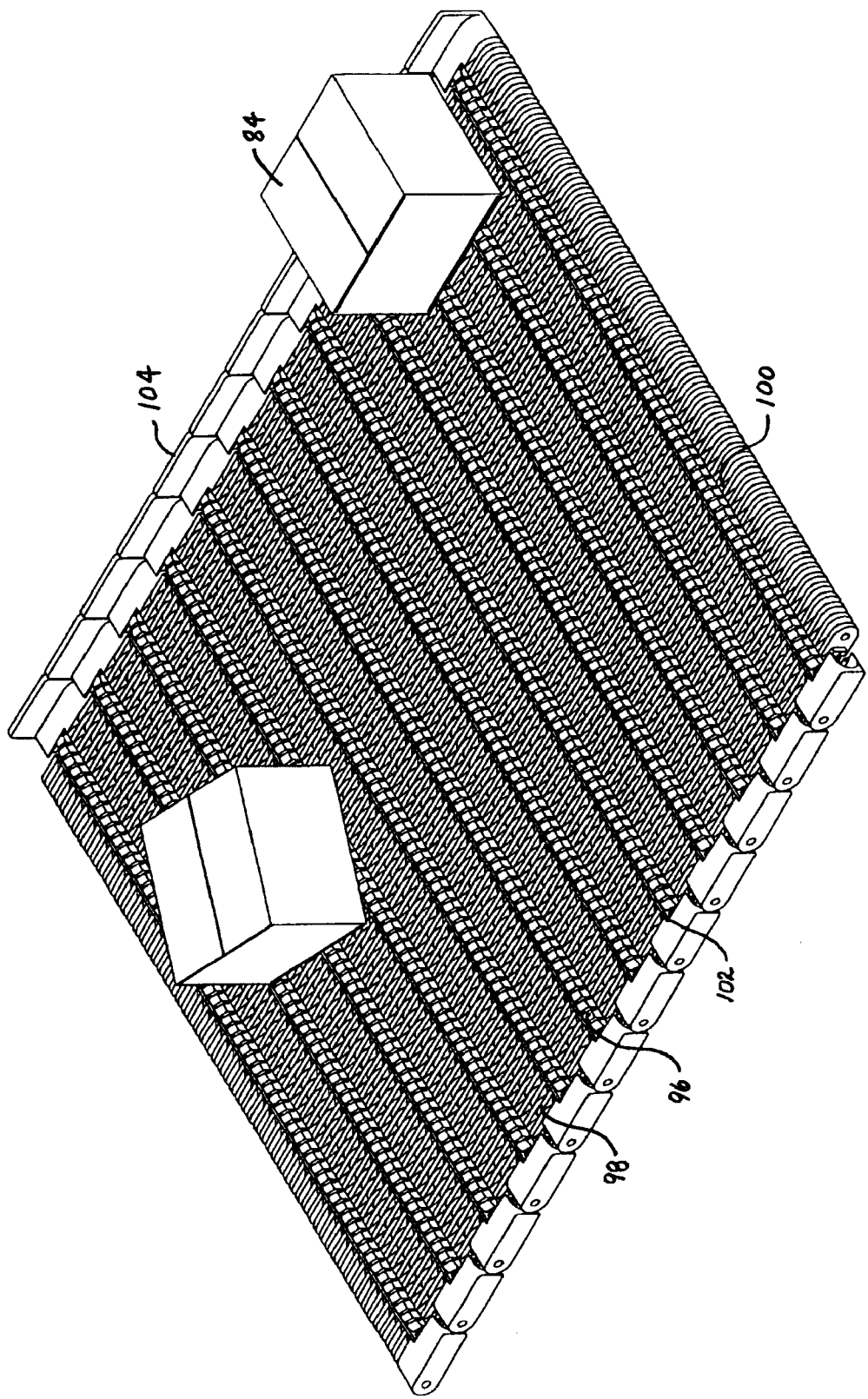
FIG. 10 is an isometric view of a portion of another version of a conveyor belt having features of the invention including a positioning belt serving as a carrier.

Yet another version of conveyor belt for diverting articles is illustrated in FIG. 10. Unlike the conveyor belts shown in FIGS. 1 and 8, this conveyor belt uses the positioning belt itself to move articles 84 transversely across the conveyor belt. The conveyor belt includes a cam follower that functions as described in the other conveyor versions. In this version, however, the outer surface of the positioning belt 96 is disposed above the top surface 98 of the module 100 to serve as an integral transport element. The outer surface of the positioning belt, which moves with the cam follower, supports and transports conveyed articles across the width of the conveyor belt. Because the top track 102 in these modules does not guide a separate pusher or carrier, the track could be formed by a shallower, lipless recess. Each of the modules is shown with an optional sideguard 104 at one belt edge, which makes this conveyor belt especially useful in aligning articles against the sideguards. Articles could be transported onto or off the side edge of the conveyor belt without the sideguards or at an end of the conveyor carryway. The top surface of the positioning belt is preferably made of a high-friction material or is appropriately textured to engage the bottoms of conveyed articles.

The module body, the cam follower, the pusher, and the carrier are preferably plastic pieces formed by injection-molding. The wheel could likewise be injection-molded or could be machined. The positioning belt is preferably a rubber belt. But manufacturing technologies and materials other than those most preferred could alternatively be used.

Figure 12:
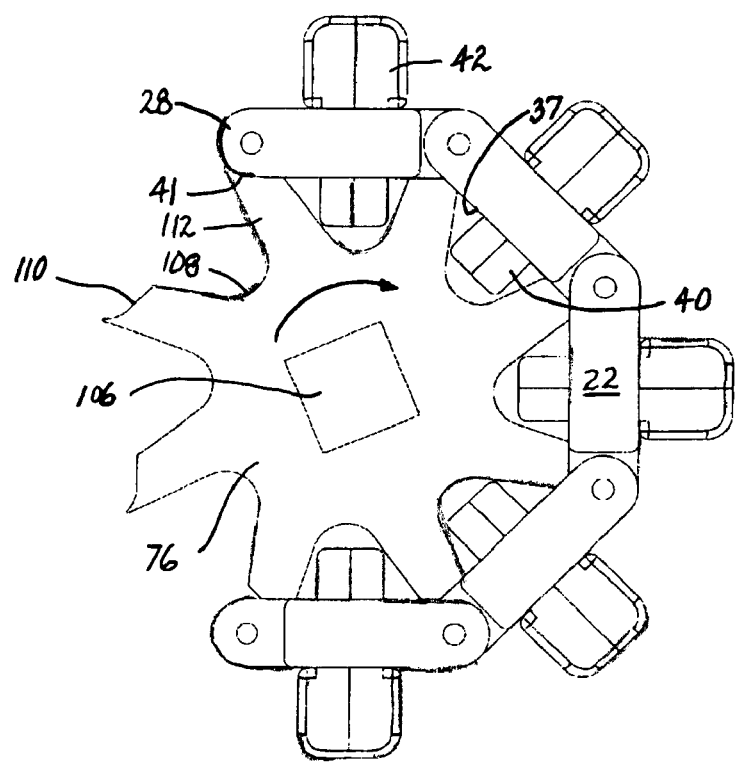
FIG. 12 is a side elevation view of a sprocket shown driving a conveyor belt as in FIG. 11.
Figure 11:
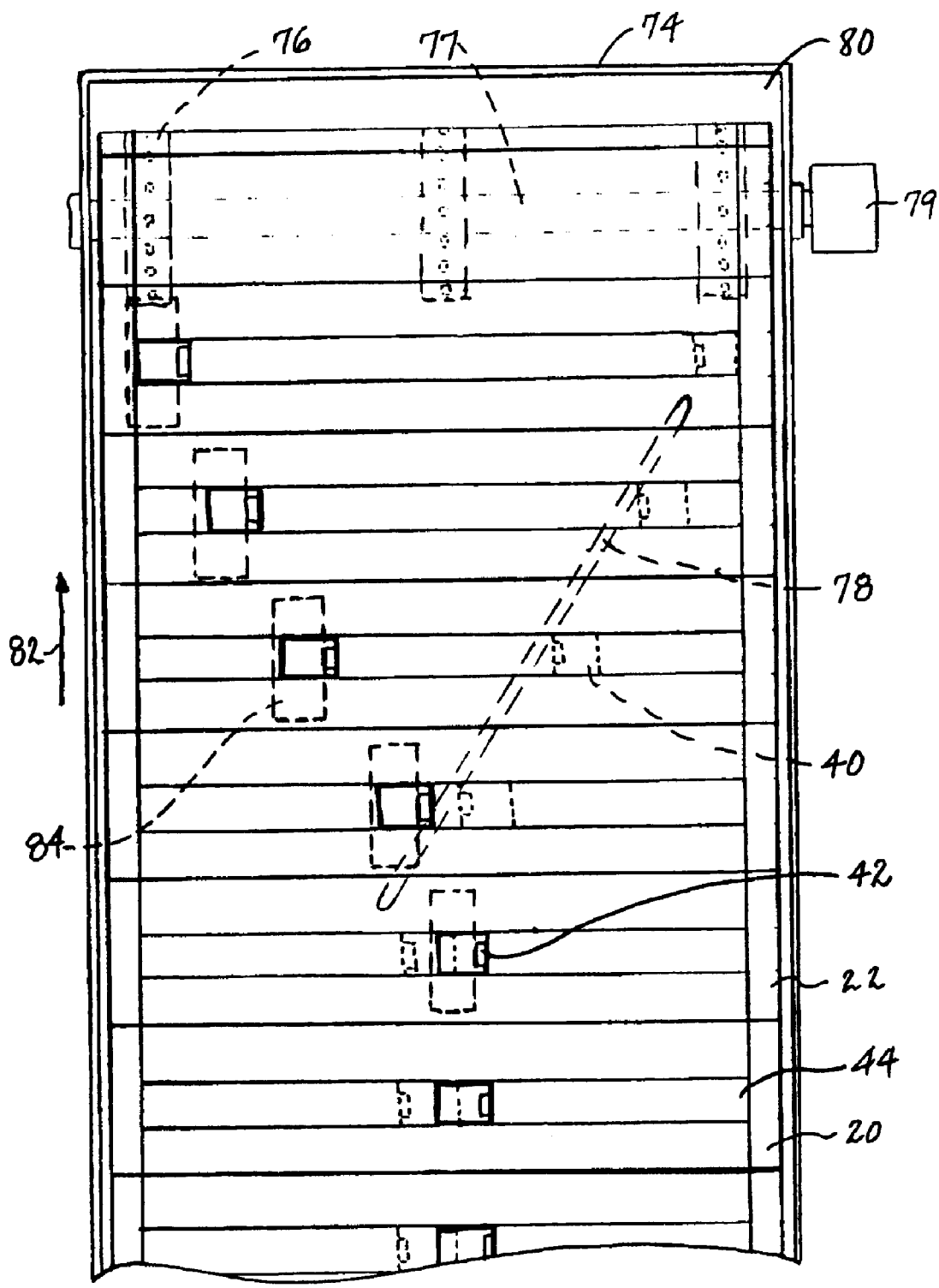
FIG. 11 is a top schematic view of a portion of a conveyor system with a conveyor belt as in FIG. 1 and guide tracks to divert articles along the conveying path.

A top view of a portion of a diverting conveyor belt is shown in FIG. 11. The conveyor belt 20 is constructed of a series of belt modules 22 as in FIG. 1. The conveyor belt is supported in a conveyor frame 74 and is driven on belt driving surfaces by sprockets 76 defining ends of the conveying path. Typically the sprockets at one end are drive sprockets and those at the other end (not shown) are idler sprockets. Details of one version of sprocket are shown in FIG. 12. A sprocket 76 includes a central bore 106 to receive a shaft 77. The sprocket is characterized by deep pockets 108 between consecutive teeth 110 formed on the periphery of the sprocket at the ends of arms 112. The teeth have a profile complementary to the profile of the drive surfaces 41 of the hinge elements 28. The pockets provide clearance for the cam followers 40 extending from the bottom sides 37 of the modules 22. A sprocket without the deep pockets could alternatively be used in conjunction with a guide network that directs the cam followers to transverse positions clear of the sprockets.

A network of guides 78 is arranged in the conveyor bed 80. The guides form cam surfaces that guide the protruding cam follower 40 across the module as the conveyor belt moves in the direction of travel 82. As the cam follower moves, it causes the pusher 42 on the top side of the module to move by means of their linkage through the positioning belt 44. In the version of diverting conveyor shown, the cam follower and the pusher are attached to the positioning belt at diametrically opposite positions. As the cam follower moves from left to right, the pusher moves from right to left, i.e., the pusher and the cam follower move simultaneously in opposite directions. For this reason, the arrangement of the guide surfaces is opposite the desired position of the pusher. To move conveyed articles 84 to the left in FIG. 11, the guides are arranged to direct the cam follower to the right. The simple guide arrangement shown is for illustration only. Much more complex networks could be used for directing conveyed articles across the belt to predetermined transverse positions at locations along the conveying path.

One example of an automated guide network is depicted in FIG. 13. The guide network has a sequence of parallel, skewed lanes 114 angled diagonally across a conveyor carryway bed 116. The skewed lanes communicate with a pair of parallel longitudinal lanes 118, 119 on opposite sides of the bed. Angled slots 120 outside the longitudinal lane 119 receive blocking elements 122 connected to push rods 124 of actuators 126, such as pneumatic cylinders, controlled by signals transmitted over signal lines 127 by an intelligent controller 129, such as a programmable logic controller, a personal computer, or hard-wired logic circuits. The blocking elements are shown in FIG. 13 in a first retracted, non-blocking position that allows a cam follower 40 of a conveyor belt traveling in the direction of arrow 128 to ride straight along the left-hand longitudinal lane 119. If, for example, three of the blocking elements (as indicated by the broken lines 122') are simultaneously pushed into second blocking positions, they will divert the cam followers 40' on three consecutive belt rows from the left-hand lane into the skewed lanes. Once the cam followers enter the skewed lanes, the blocking elements can be retracted to allow other cam followers through. The side walls 130 bounding the skewed lanes direct the cam followers to move articles across the conveyor belt until the cam followers reach the right-hand longitudinal lane 118.

Although the invention has been described in detail with reference to example versions, other versions are possible. For example, the guide surfaces themselves could be movable. As another example, the cam follower, the pusher, and the carrier could alternatively be formed as unitary pieces, rather than the split pieces depicted in the drawings. As yet another example, the flat positioning belt could, in some versions, be replaced by a cable, string, round belt, or the like attached to modified attachment structures in the cam follower and the transport element. Thus, as used in the claims, the term positioning belt is not meant to be limited to flat or cogged belts only, but to other structures capable of performing the same function. Furthermore, the terms top, bottom, left, right, forward, and rearward are used only for convenience of reference to the drawings. They are not meant to be limited to a specific geometrical layout. As these examples suggest, the claims are not meant to be limited to the specific preferred versions described in detail to illustrate the invention.

What is claimed is:

1. A conveyor belt module, comprising:
   a module body extending longitudinally from a forward end to a rearward end, transversely from a left edge to a right edge, and in thickness from a top side to a bottom side and suitable for being interconnected end to end to other module bodies to form a conveyor belt;
   a positioning belt arranged to move transversely on the module body; and
   a cam follower attached to the positioning belt and extending below the bottom side of the module for movement with the positioning belt.

2. A conveyor belt module as in claim 1 wherein the module body further comprises a top track transversely arranged along the top side of the module body.

3. A conveyor belt module as in claim 1 wherein the module body further comprises a bottom track transversely arranged along the bottom side of the module body and along which the cam follower rides.

4. A conveyor belt module as in claim 1 further comprising a wheel at each of the left and right edges about which the positioning belt is looped.

5. A conveyor belt as in claim 1 wherein an outer surface of the positioning belt extends above the top side of the module body.

6. A conveyor belt comprising a series of rows of conveyor belt modules as in claim 1 interconnected end to end by hinge pins.

7. A conveyor belt module as in claim 1 wherein the positioning belt includes cogs disposed on an outer surface of the positioning belt.

8. A conveyor belt module as in claim 7 wherein cogged slots are formed in the cam follower to mate with the cogs on the outer surface of the positioning belt.

9. A conveyor belt module as in claim 1 further comprising a transport element extending above the top side of the module body and attached to the positioning belt for movement with the cam follower and the positioning belt.

10. A conveyor belt module as in claim 9 wherein the module body further comprises a top track transversely arranged along the top side of the module body and along which the transport element rides.

11. A conveyor belt module as in claim 9 wherein the transport element is a pusher for pushing articles transversely across the width of the module.

12. A conveyor belt module as in claim 9 wherein the positioning belt includes cogs disposed on an outer surface of the positioning belt and wherein cogged slots are formed in the transport element to mate with the cogs on the outer surface of the positioning belt.

13. A conveyor belt module as in claim 9 wherein the transport element is a carrier for carrying articles transversely across the width of the module.

14. A conveyor belt as in claim 13 wherein the carrier includes a high-friction top layer.

15. A conveyor belt module, comprising:
   a module body extending longitudinally from a forward end to a rearward end, transversely front a left edge to a right edge, and in thickness from a top side to a bottom side and including a plurality of hinge elements spaced apart transversely along the forward and rearward ends of the module body suitable for being interleaved with hinge elements along forward and rearward ends of other module bodies to form a conveyor belt of module bodies interconnected end, the module body including a top track extending transversely across the top side of the module between the forward and rearward ends; and
   a transport element arranged to ride in the top track.

16. A conveyor belt module as in claim 15 further comprising:
   a bottom track formed in the module body and extending transversely across the bottom side of the module body between the forward and rearward ends; and
   a cam follower arranged to ride in the bottom track.

17. A conveyor belt module as in claim 16 further comprising a positioning belt looped transversely around the module body in the top and bottom tracks and attached to the transport element and the cam follower.

18. A modular conveyor belt, comprising:
   a series of rows of belt modules, each belt module including:
      a module body extending longitudinally from a forward end to a rearward end, transversely from a left edge to a right edge, and in thickness from a top side to a bottom side;
      hinge elements spaced apart transversely along the forward and rearward ends of the module body;
   at least some of the belt modules including:
      a cam follower extending from the bottom side and arranged to move transversely across the bottom side of the module body;
      a transport element extending from the top side and arranged to move transversely across the top side of the module body;
      the transport element being linked to the cam follower so that the transport element moves across the top side as the cam follower moves across the bottom side;
   a plurality of hinge pins extending through interleaved forward and rearward hinge elements of adjacent rows of belt modules to interconnect adjacent rows at a hinge joint.

19. A modular conveyor belt as in claim 18 wherein the transport element is a pusher arranged to push articles transversely across the conveyor belt.

20. A modular conveyor belt as in claim 18 wherein each belt module comprises a positioning belt attached to the cam follower and the transport element and linking their movement.

21. A modular conveyor belt as in claim 18 wherein the transport element and the cam follower move in opposite directions.

22. A modular conveyor belt as in claim 18 wherein the transport element is a carrier arranged to carry articles transversely across the conveyor belt.

23. A modular conveyor belt as in claim 22 wherein the carrier comprises a platform topped with a high-friction top surface layer.

24. A modular conveyor belt, comprising:
   a series of rows of belt modules, each belt module including:
      a module body extending longitudinally from a forward end to a rearward end, transversely from a left edge to a right edge, and in thickness from a top side to a bottom side;
      hinge elements spaced apart transversely along the forward and rearward ends of the module body;
   at least some of the belt modules including:
      a cam follower extending from the bottom side and arranged to move transversely across the bottom cade of be module body;
      a positioning belt attached to the cam follower to move with the cam follower;
   a plurality of hinge pins extending through interleaved forward and rearward hinge elements of adjacent rows of belt modules to interconnect adjacent rows at a hinge joint.

25. A modular conveyor belt as in claim 24 wherein at least some of the belt modules include:
   a transport element extending from the top side and arranged to move transversely across the top side of the module body;
   the transport element being attached to the positioning belt so that the transport element moves across the top side as the cam follower move across the bottom side.

26. All article-diverting conveyor system comprising:
   a modular conveyor belt comprising a series of rows of belt modules, at least some of the belt modules including:
      a module body extending longitudinally from a forward end to a rearward end, transversely from a left edge to a right edge, and in thickness from a top side to a bottom side;
      a cam follower extending from the bottom side and arranged to move transversely across the bottom side of the module body;
      a transport element extending from the top side and arranged to move transversely across the top side of the module body;
      the transport element being linked to the cam follower so that the transport element moves across the top side as the cam follower moves across the bottom side;
      a plurality of hinge pins interconnecting adjacent rows at a hinge joint and forming an endless conveyor belt;
   a network of guides disposed at the bottom side of the modular conveyor belt along a carryway portion of the conveyor system, the guides engaging the cam followers to direct them across the belt to position the transport elements at predetermined transverse positions at specific locations along the carryway.

27. A conveyor belt module as in claim 26 wherein an outer surface of the positioning belt extends above the top side of the belt module.

28. A conveyor belt module comprising:
   a module body extending longitudinally from a forward end to a rearward end, transversely from a left edge to a right edge, and in thickness from a top side to a bottom side and suitable for being interconnected end to end to other module bodies to from a conveyor belt;
   a top track formed as a recess extending transversely across the top side of the module body;
   a bottom track formed as a recess extending transversely across the bottom side of the module body;
   a cam follower arranged to ride along the bottom track; and
   an endless positioning belt received in the recesses on the top and bottom sides and connected to the cam follower.

29. A conveyor belt module as in claim 28 wherein the top and bottom tracks are about midway between the forward and rearward ends on the module body.

30. A conveyor belt module as in claim 28 further comprising a transport element arranged to ride along the top track.

31. A conveyor belt module as in claim 28 further comprising a wheel disposed at the left edge and at the right edge of the module body and arranged to rotate about longitudinal axes with the positioning belt looped about the wheels at the left and right edges, whereby the wheels direct the positioning belt between the top and bottom tracks.

32. A modular conveyor belt, comprising:
- a series of rows of belt modules extending in width from a left edge to a right edge and in thickness from a top side to a bottom side, wherein at least some of the rows include:
  - a first recess in the top side of the row and extending along the width of the row;
  - a second recess in the bottom side of the row and extending along the width of the row; and
  - a positioning belt received in the first and second recesses on the top and bottom sides.

33. A modular conveyor belt as in claim 32 wherein at least some of the rows further include a wheel at each of the left and right edges about which the positioning belt is looped.

34. A modular conveyor belt as in claim 32 wherein at least some of the rows further include a cam follower that rides in a bottom track formed by the second recess in the bottom side of the row.

35. A modular conveyor belt as in claim 32 wherein at least some of the rows further include a transport element that rides in a top track formed by the first recess in the top side of the row.

36. A modular conveyor belt, comprising:
- a series of rows of belt modules extending in width from a left edge to a right edge and in thickness from a top side to a bottom side, wherein at least some of the rows include:
  - an endless positioning belt extending across the width of the row on the top and bottom sides and along the thickness of the row at the left and right edges.

37. A modular conveyor belt as in claim 36 wherein at least some of the rows further include a wheel at each of the left and right edges about which the endless positioning belt is looped.

38. A modular conveyor belt as in claim 36 wherein at least some of the rows further include a cam follower attached to the endless positioning belt on the bottom side of the row.

39. A modular conveyor belt as in claim 36 wherein at least some of the rows further include a transport element attached to the endless positioning belt on the top side of the row.

40. A modular conveyor belt as in claim 36 wherein an outer surface of the endless positioning belt supports and transports conveyed articles along the top side of the belt.

41. An automated conveyor system, comprising:
- a conveyor bed;
- a conveyor belt supported in the bed along a conveyor carryway and extending transversely from a right side edge to a left side edge, in thickness from a top side to a bottom side, and longitudinally in the direction of belt travel;
- the conveyor belt including a series of rows of belt modules and a plurality of hinge pins interconnecting adjacent rows of belt modules together at hinge joints formed between adjacent rows;
- the conveyor belt including cam followers arranged to move transversely along the bottom side of the conveyor belt at longitudinally spaced locations;
- the conveyor bed including an automated guide network comprising:
  - a right-hand lane extending longitudinally along one side of the conveyor bed;
  - a left-hand lane extending longitudinally along the opposite side of the conveyor bed;
  - a series of skewed lanes formed diagonally across the conveyor bed and communicating with the left-hand lane and the right-hand lane, wherein the right-hand, left-hand, and skewed lanes are sized to receive the cam followers;
  - blocking elements positioned along the left-hand lane and operable to move between a first retracted position clear of the left-hand lane and a second blocking position blocking the left-hand lane;
  - each blocking element associated with an individual skewed lane and directing a cam follower into the associated skewed lane when the blocking element is in the second blocking position;
  - actuators connected to the blocking elements to move the blocking elements between the first retracted position and the second blocking position and suitable for simultaneously moving consecutive blocking elements into second blocking positions to simultaneously direct consecutive cam followers into consecutive skewed lanes.

* * * * *